United States Patent [19]

Fitingof et al.

[11] Patent Number: 5,311,521
[45] Date of Patent: May 10, 1994

[54] METHOD AND APPARATUS FOR IMPLEMENTING POST-MODULATION ERROR CORRECTION CODING SCHEME

[76] Inventors: Boris Fitingof, 1802 E. Helen, Apt. B220, Tucson, Ariz. 85719; Masud Mansuripur, 4072 E. Via Dela Tangara, Tucson, Ariz. 85718

[21] Appl. No.: 466,110

[22] Filed: Jan. 12, 1990

[51] Int. Cl.$^5$ .................................... H03M 13/00
[52] U.S. Cl. .................................... 371/37.4; 371/39.1
[58] Field of Search .................... 371/37.1, 37.4, 39.1

[56] References Cited

U.S. PATENT DOCUMENTS

| | | | |
|---|---|---|---|
| 4,146,909 | 3/1979 | Beckenhauer et al. | 360/39 |
| 4,413,251 | 11/1983 | Adler et al. | 341/59 |
| 4,769,818 | 9/1988 | Mortimer | 371/37.4 |

OTHER PUBLICATIONS

Horowitz, P. et al., *The Art of Electronics*, 1989, Cambridge University Press, p. 527.
Vivian, R., "Enhanced Graphics for Teletext", *IEEE Trans. on Consumer Electronics*, vol. CE-27, No. 3, Aug. 1981, pp. 541-550.
Hindin, H., "Terminal Decodes All Videotex", *Electronics*, Jul. 14, 1982, p. 50.
Schmitz, H. et al., "A CCD Memory Controller for Instant Access to Teletext", *IEEE Trans. on Consumer Electronics*, vol. CE-30, No. 3, Aug. 1984, pp. 442-446.
W. Bliss, "Circuitry for Performing Error Correction Calculations on Baseband Encoded Data to Eliminate Error Propagation", *IBM Technical Disclosure Bulletin*, vol. 23, No. 10, Mar. 1981, pp. 4463-4464.
G. Ledford, "IC Decoder Paves the Way for Videotex Revolution", *Computer Design*, Jun. 1, 1984, pp. 87-99.
M. Slater, *Microprocessor-Based Design*, copyright 1987, Mayfield Publishing Co., p. 446.
*Magnetic Recording*, vol. 2: Computer Data Storage edited by C. Denis Mee and Eric E. Daniel, McGraw Hill, New York (1988); Chapter 5, pp. 243-304.

*Primary Examiner*—Stephen M. Baker
*Attorney, Agent, or Firm*—Dickstein, Shapiro & Morin

[57] ABSTRACT

A method of and apparatus for providing error correction coding for a block of user data in which the user data is initially modulated by a first modulator and then the modulated user data is error correction encoded to produce a first plurality of check bits. The first plurality of check bits are then modulated by a second modulator whose output is then fed to a second error correction encoder which produces a second plurality of check bits. The modulated user data, the first plurality of check bits and the second plurality of check bits are all fed to a shift register where the error correction encoded user data block is formed, useful with magnetic and optical storage devices.

4 Claims, 4 Drawing Sheets

METHOD AND APPARATUS FOR IMPLEMENTING POST-MODULATION ERROR CORRECTION CODING SCHEME

CROSS-REFERENCE TO RELATED APPLICATION

This application is related to U.S. patent application Ser. No. 07/550,505, which is a continuation of U.S. patent application No. 07/464,257, entitled Method and Apparatus for Providing Maximum Rate Modulation or Compression Encoding and Decoding, filed concurrently herewith, now U.S. Pat. No. 5,099,237. The instant application is commonly assigned with that application. The disclosure of that application is incorporated herein by reference as if fully set forth in this application.

BACKGROUND OF THE INVENTION

The present invention relates generally to a method and apparatus for implementing an error correction coding scheme for use with digital-to-digital coding. More particularly, the present invention relates to a method of and apparatus for providing efficient error correction coding for use with modulation codes having arbitrary constraints.

The use of modulation codes in connection with magnetic and optical data storage systems is widespread and the advantages of modulation coding are well known. For example, in U.S. Pat. No. 3,689,899, entitled Run-Length Limited Variable Length Coding With Error Propagation Limitation, a run-length limited variable length code with error propagation limitation is disclosed. U.S. Pat. No. 4,146,909, issued Mar. 27, 1979 for a Sync Pattern Encoding System for Run-Length Limited Codes, discloses a system in which a continuous bit stream of the proper character is continuously supplied to an encoder.

In such storage systems, a 1 is usually used to represent a transition between the up and down states of the recording waveform, while a 0 is used to represent no change in the waveform. However, in practice, an unconstrained sequence of 1's and 0's is undesirable. For example, a long sequence of uninterrupted 0's results in a loss of synchronization when the data is self-clocking. Also, the imbalance between the up and down states of the recording waveform may result in significant charge accumulation in the electronic circuitry which results in forcing the system beyond acceptable levels of operation.

The objective of modulation coding is therefore to create a one-to-one correspondence between sequences of user data, which are usually streams of random binary digits, and constrained binary sequences. The nature of the constraints imposed upon the modulation signal is determined by the system designer and is dependent upon the particular characteristics of the system under consideration.

A typical set of restrictions imposed upon a recording sequence is the so-called (d,k; c) constraint. In this constraint, the d is the minimum allowed run-length of 0's, the k is the maximum allowed run-length of 0's and the c is the maximum charge that the recording waveform is permitted to accumulate. In addition, certain sequences of bits may be reserved for special purposes, such as signalling at the beginning of a block, and thus be banned from appearing at all in the modulated waveform. A (2,7) run length limited (RLL) code is a commonly used example of such a constraint which is used in connection with magnetic and optical data storage.

The minimum run-length constraint d is somewhat more subtle than the k and c constraints and thus needs further elaboration. In practice, the physical separation between successive transitions on the recording medium cannot be made arbitrarily small. The minimum distance between transitions is a function of the structural and/or magnetic properties of the medium, as well as the characteristics of the read/write head. Thus, the gap-width of the magnetic recording head or the wavelength of light in optical recording, together with the structural/magnetic features of the recording medium, determine the minimum distance.

It is useful to measure distance along the track in terms of $\Delta$. Thus, in the discussion which follows, density is defined as the number of bits per $\Delta$.

If there are no constraints on the minimum run-length of 0's, for example, if d equals 0, then each modulation bit will occupy one interval of length $\Delta$. Since the number of modulation bits is always greater than the number of data bits, the overall recording density becomes less than 1 data bit per $\Delta$. If, on the other hand, d is not equal to 0, then $d+1$ modulation bits can be packed in every interval of length $\Delta$.

When the code parameters are properly chosen, the higher density of modulation bits can translate into a higher density recording of data bits. In that manner, the overall density becomes greater than 1 data bit per $\Delta$. However, the price of such an increase in capacity is the reduced period of time available to each modulation bit. If t is defined as the time that the read/write head dwells on an interval of length $\Delta$, then the time window available to each modulation bit will be $t/(d+1)$.

The present invention is directed to a method of and apparatus for providing error correction coding (ECC) for modulation coding with arbitrary constraints, such as for 2,7 RLL coding. However, as the modulation constraints become less restrictive, presently known error correction coding techniques do not perform their function in an efficient nor accurate manner. The error correction coding scheme of the present invention overcomes those disadvantages of prior art ECC schemes.

The present invention is also directed to an error correction scheme for preventing random errors that occur infrequently but yet corrupt modulation code words in a few unknown locations. Some of those errors may be readily detectable because they violate the modulation coding rules. However, depending upon the severity of the arbitrary constraints used with the modulation coding, in practice that type of error correction may not have the desired power.

One way in which to find the closest code word (in the Hamming sense) to the readout sequence is to utilize a Viterbi decoder. The applicability of this type of decoder for minimum distance decoding arises from the fact that modulation coding is based upon state transition tables. Thus, utilizing a Viterbi decoder during the readout process, a code word can be identified that not only satisfies all of the modulation constraints, but is also closest to the read-back waveform for a given measure of distance.

However, not all errors can be recovered in this manner. The more restrictive the modulation constraints become, the better their error-correction capabilities. However, it has been experimentally found by the inventors that (d, k; c) constraints are not powerful enough for correcting such random errors. The only instance in which the use of such constraints is powerful enough is in the case of a very small c, which results in small rates and thus much less useful constraints.

SUMMARY AND OBJECTS OF THE INVENTION

In view of the foregoing, it should be apparent that there still exists a need in the art for a method of and apparatus for providing error correction coding for a modulation code having arbitrary constraints which may be electronically implemented in a simple and precise manner to accomplish a reduction of modulation bit coding errors which is characterized by simple electronic circuitry and which has particular application for use with modulation coding with arbitrary constraint schemes.

More particularly, it is an object of this invention to provide an error correction coding scheme as aforementioned having simple and reliable electronic circuitry which does not require costly components or elaborate interconnections.

Still more particularly, it is an object of this invention to provide an error correction coding scheme utilizing a number of modulators and error correction encoders which are connected in such a manner that the user data is first modulated and then that modulated data is used to produce the check bits for the modulated input data.

The present invention is directed to a method of and apparatus for providing error correction coding for modulation coding with arbitrary constraints, such as the modulation coding scheme described in concurrently filed co-pending U.S. patent application Ser. No. 07/464,257, which was abandoned in favor of a continuation application thereof, Ser. No. 07/550,505, entitled Method and Apparatus for Providing Maximum Rate Modulation or Compression Encoding and Decoding, now U.S. Pat. No. 5,099,237. It may also be used with other modulation coding schemes using arbitrary constraints.

Two such error correcting coding schemes are disclosed herein. The first is a burst-error correction coding scheme which takes advantage of the fact that the position of a block of data affected by a long burst of errors is known to the detector because modulation constraints within that block are seriously violated.

A second error correcting coding scheme is disclosed which is designed to achieve correction for random errors within a modulated block. This scheme uses an appropriate block error correction code, such as a Reed-Solomon code. When using such a code, depending upon the probable number of errors within a block of length $L_0$, the error correction coding scheme generates a certain number of check bits $N_1$. Those check bits do not necessarily satisfy the modulation constraints and, therefore, must themselves be modulated. Assume that $L_1$ is the length of the block of $N_1$ check bits after being modulated. Since encoded blocks always begin and end in the same state, no problems arise during recording and readout if the block of length $L_1$ immediately follows the block of length $L_0$.

In certain situations, it may be desirable to apply another level of error correction to the block of length $L_1$, and to record the new set of check bits after modulating them. In fact, that process can be repeated any number of times. After the modulated block of data followed by one or more blocks of modulated check bits has been formed, a special block of length $L_s$ may be added to signal the end of the bit stream. In such a manner, the sequence of user data of length $L_0$ has been mapped onto a sequence that satisfies the modulation constraints and has a total length of $L = L_0 + L_1 + L_2 \ldots + L_s$.

For readout, this block of length L is separated into its sub-blocks. The various levels of error correction of the sub-blocks are then demodulated. The corresponding errors, if any, are then corrected. Finally, the block of length $L_0$ is demodulated and the original $N_0$ bits of user data are recovered.

In its apparatus aspects, the present invention is directed to an error correction encoding scheme in which the user data block is fed to a first shift register which then shifts the raw user data into a modulator which produces a modulated data block of length m. The modulated data block of length m is fed to an error correction encoder which provides, in addition to the modulated user data, a plurality of check bits related thereto.

The plurality of check bits are then modulated by a second modulator and fed to a second error correction encoder. The second error correction encoder provides a second plurality of related check bits, this time related to the modulated first set of check bits. Additional levels of modulators and error correction encoders may be utilized further, if desired. If only two levels of modulators and error correction encoders are provided, then the modulated raw user data, the modulated first plurality of check bits and the second plurality of check bits are all fed to a shift register, whose contents are then the desired error correction encoded user data block.

For decoding, the above-described process is reversed.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
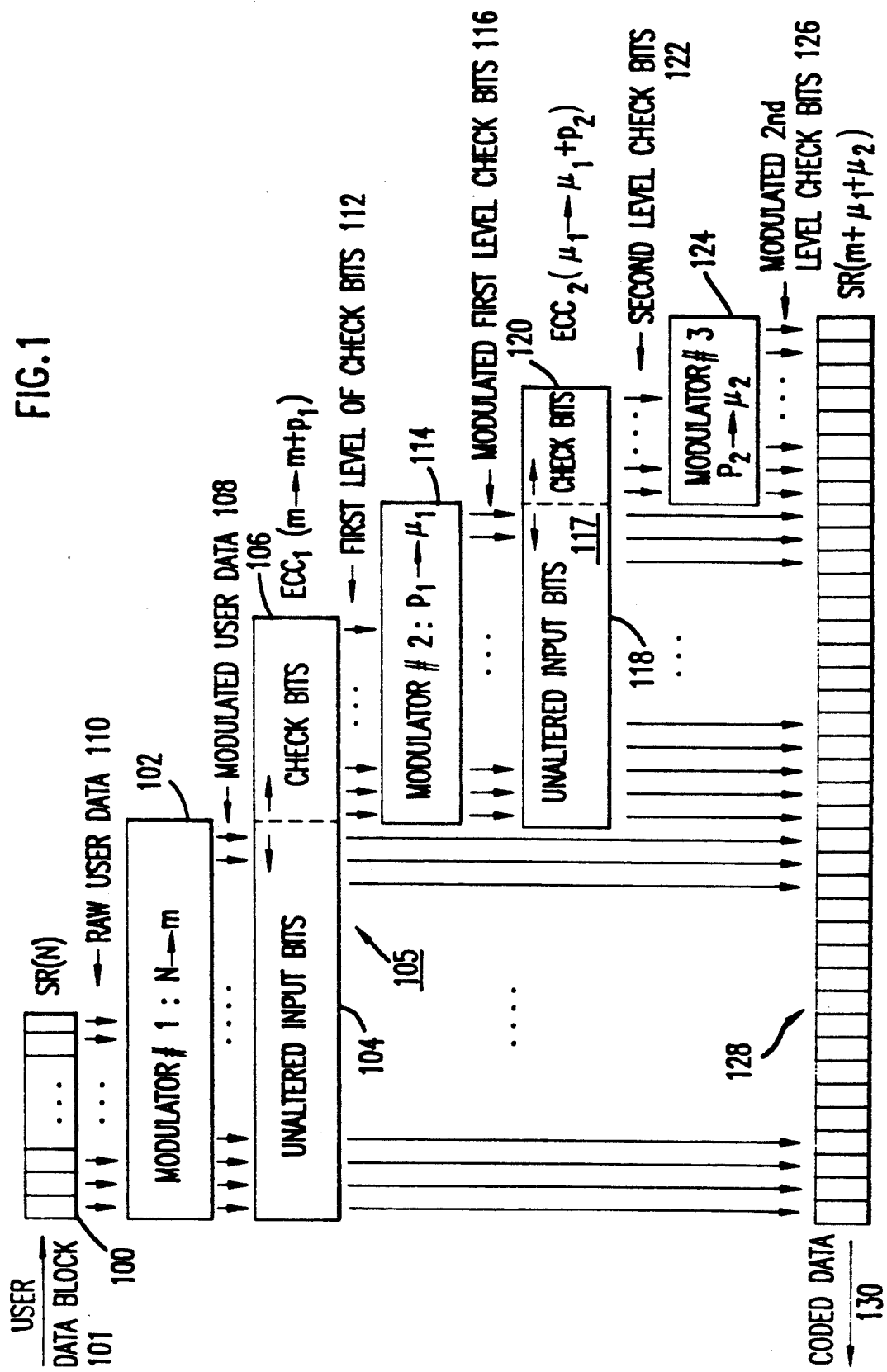
FIG. 1 is a block diagram showing the apparatus of the present invention for implementing a post-modulation error correction.

FIG. 1 shows a post-modulation error correction encoder which is useful with the long blocks of data which may be encoded and decoded by means of the enumerative modulation encoder described in the United States patent application set forth in the cross-reference to related application. However, other modulation encoders/decoders, such as traditional (d,k,c), may also be used with the present invention. The problem with such encoders of long blocks of data is that a single error in the block is sufficient to cause incorrect decoding of that entire block. In order to remedy that problem, error correction coding is used after the modulation of the user data by the encoder.

To accomplish the error correction coding, a block of modulation code of length $L_0$ may be corrected for a certain number of errors, for example z, if 2z check bits are appended to it using the Reed-Solomon algorithm. However, since those check bits do not satisfy the modulation constraint of the enumerative modulation encoder, they have to be modulated before being appended to the original block of data of length $L_0$. There is, however, no problem in appending one modulated block to another in the manner described, since individual blocks always begin and end in the same state.

A different modulation scheme may alternatively be used for the check bits. For example, one that is less susceptible to random errors than the modulation scheme used for the user data block may be employed. In that case, the check bits may not be packed quite as efficiently as the data bits. However, since they occupy only a small fraction of the total storage area, the sacrifice in space is not too costly. It is, of course, possible to apply yet another level of error correction coding to the block of modulated check bits, and then to repeat the process until the integrity of the data after going through modulation and demodulation is assured.

A post-modulation error correction encoder suitable for correcting for such random errors in shown in FIG. 1. The block of user data 101, which is a block of binary data of length N, is first fed to a shift register 100 of length N. The output from the shift register is fed to the input of a first modulator 102, which may be, for example, the modulator shown in the concurrently filed cross-referenced United States patent application. That modulator 102 converts the user block of data of length N to a modulated block of data of length m.

The output from the modulator 102, namely the modulated user data 108 of length m, is then input into a first error correction encoder 105. That first error correction encoder may be, for example, any commercially available error correction encoding integrated circuit, such as a Reed-Solomon encoder manufactured by Western Digital Corporation under part number WD60CAD. That part includes both an encoder and a decoder. Such encoders may be divided into two portions. A first portion 104 is used to store the unaltered input bits or modulated user data 108, and a second portion 106 is used to store the generated check bits corresponding to the modulated user data 108. The output from the first error correction encoder 105 is the original block of m input bits plus a first level of check or parity bits 112, which consists of $p_1$ check bits.

The unaltered input bits or modulated user data 108 are then fed directly to a second shift register 128, whose function will be described later. The first level of check or parity bits 112 are simultaneously fed to a second modulation encoder 114. This second modulator encod r 114, like the first modulator encoder 102, may be the enumerative encoder disclosed in the cross-referenced United States patent application, or may be some other readily available modulation encoder. The second modulator encoder 114 functions to encode the $p_1$ check bits 112 into $u_1$ bits which satisfy the modulation constraints of the modulator 114.

The output from the second modulator 114 is the modulated first level of check bits 116. It is output by the modulator 114 to the shift register 128 which assembles the coded data block 130.

The foregoing process can be repeated any number of times with an error correction encoder followed by a modulation encoder followed by an error correction encoder, and so on. Although FIG. 1 shows only two levels of correction/modulation, the process may be continued using any arbitrary number of steps as has just been described.

The modulated check bits 116 produced by the modulator 114 are then fed to a second error correction encoder 117, which may be the same component as the first error correction encoder 105. It is structured in the exact same manner; that is, it includes a portion 118 which stores and then passes the unaltered input bits 112 to the shift register 128 and utilizes a second portion 120 which generates second level $p_2$ check bits 122. Thus, the second error correction encoder 117 functions to map the modulated $u_1$ bits onto modulated $u_1$ bits + $p_2$ check bits.

The second level $p_2$ check bits 122 may then be fed to a third modulator 124, which may be the same part as the first and second modulators 102 and 114, respectively. The modulator 124 modulates the second level $p_2$ check bits 122 to produce modulated second level check bits $u_2$ 126. The output from the modulator 124 is also fed to the shift register 128.

As will be obvious to those of ordinary skill in the art, the modulated blocks of lengths m, $u_1$ and $u_2$ are loaded as they are produced into the next element until an entire block is loaded into the shift register 128 which is of length m + $u_1$ + $u_2$. The modulated and error correction coded user data block 130 is then shifted out of the shift register 128 to its final destination, which may be either a magnetic or optical disk or a magnetic tape storage medium.

In summary, then, the circuitry of FIG. 1 operates in such a manner that each of the steps or stages shown in FIG. 1 must be completed in sequential order, proceeding from the top of the figure, to the bottom. First, the user data block 101 is loaded into the shift register 100, of length N. Then, the first modulator 102 acts on the raw user data 101 output from the shift register 100 to create the modulated user data 108. The first error correction encoder 105 acts on the modulated user data 108 to produce m + $p_1$ bits at its output. The m bits, which are the modulated user data 108, are fed to parts of a second shift register 128, which assembles the encoded data block 130 corresponding to the input user data block 101.

The first level $p_1$ of check bits 112 is fed to a second modulator 114, which acts on the first level $p_1$ check bits 112 to produce the modulated first level $u_1$ check bits 116.

The second error correction coder acts upon the modulated first level $u_1$ check bits 116 to produce $u_1$ + $p_2$ bits at its output. The $u_1$ bits are fed to locations in the second shift register 128 immediately following the storage locations of the m bits output from the first error correction coder 105. The second level $p_2$ check bits 122 are fed to a third modulator 124 which generates modulated second level $u_2$ check bits 126, which are loaded into locations in the second shift register adjacent to the locations of the $u_1$ bits.

As has been described, at the end of the sequential operation of the shift register 100, modulators 102, 114 and 124 and error correction coders 105 and 117, the second shift register 128 contains the output bits of length m + $u_1$ + $u_2$. The second shift register 128 is then emptied, which produces the coded data 130 which may then be stored on storage media or transmitted via any appropriate means.

Figure 3:
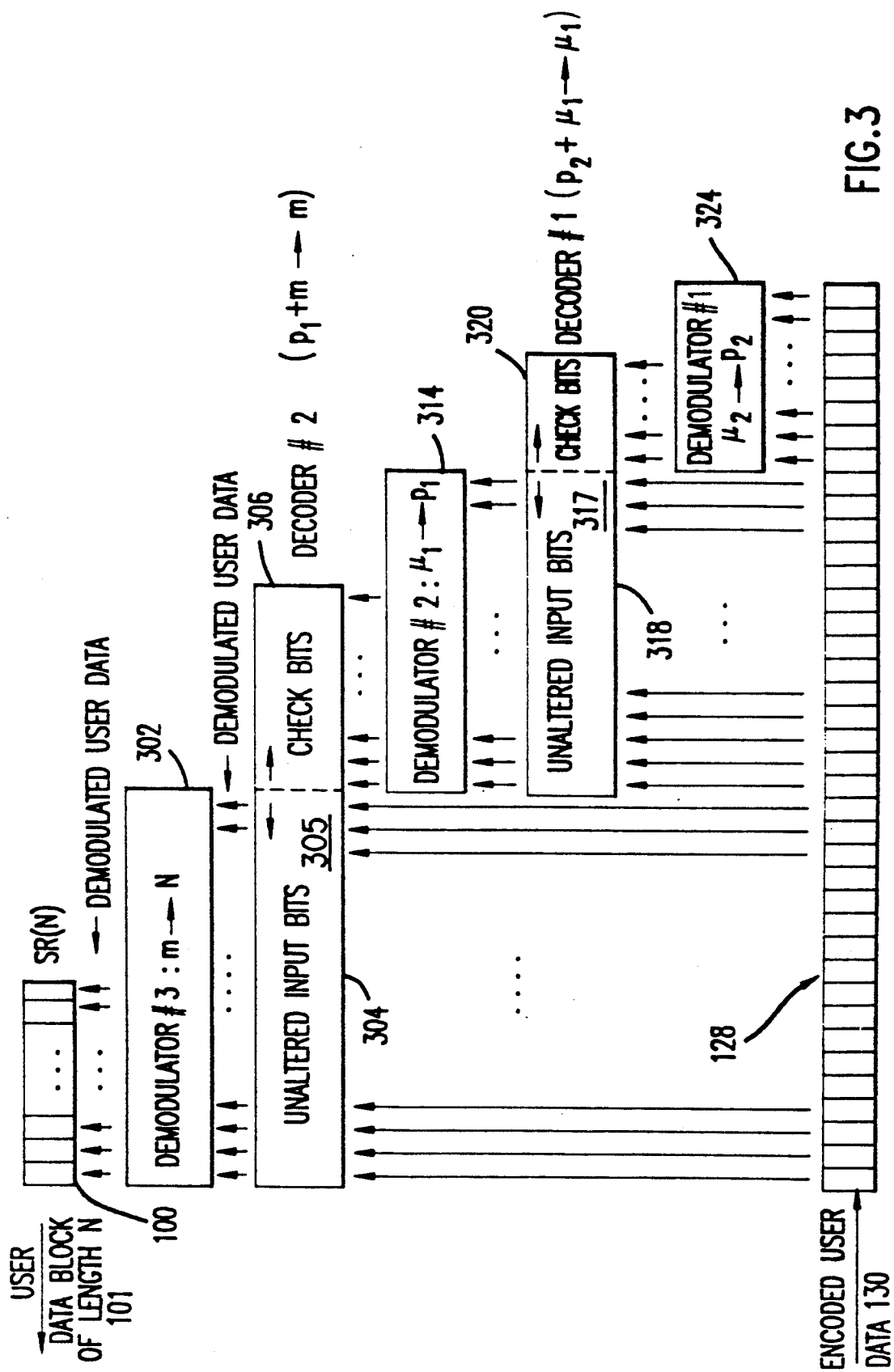
FIG. 3 is a block diagram showing the apparatus of the present invention for decoding the error correction encoding accomplished by the circuitry of FIG. 1.

The decoding process, that is, the decoding of data transmitted from a magnetic or optical disk or magnetic tape to the user uses a similar circuit to that shown in FIG. 1. As shown in FIG. 3, the direction of the data flow is opposite to that of FIG. 1. The modulators 102, 114 and 124 of FIG. 1 are replaced by enumerative demodulators 302, 314 and 324, as has been disclosed in the cross-referenced co-pending application, or with other demodulators which are commercially available counterparts to the commercially available modulators described above. Likewise, the error correction encoders 105 and 117 of FIG. 1 are replaced with error correction decoders 305, 317 which provide corresponding decoding to the encoding circuitry previously described. For illustrative purposes only, the error correction encoders 105 and 117 may be part number WD60CAD available from Western Digital Corporation and the error correction decoders 305 and 317 may also be that same part.

As will be understood by those of ordinary skill in the art, error correction coders such as elements 105 and 117 must always be paired with and followed by a modulator, such as elements 114 and 124 of FIG. 1. The same is of course true with respect to the decoder circuitry shown in FIG. 3, except that the modulators must always precede and be paired with decoders, such as the pair of demodulator 324 and decoder 317 and the demodulator 314 and decoder 305. That is because the new check bits generated by the error correction coder do not automatically satisfy the modulation constraints and must therefore be modulated before being sent to a disk or tape for storage.

Therefore, as shown in FIG. 1, the first error correction coder 105 is paired with the second modulator 114 and the second error correction coder 117 is paired with the third modulator 124. The first modulator 102 does not act on the check bits but rather on the original user data 101. Therefore, the first modulator 102 need not be paired with any error correction coder.

Figure 2:
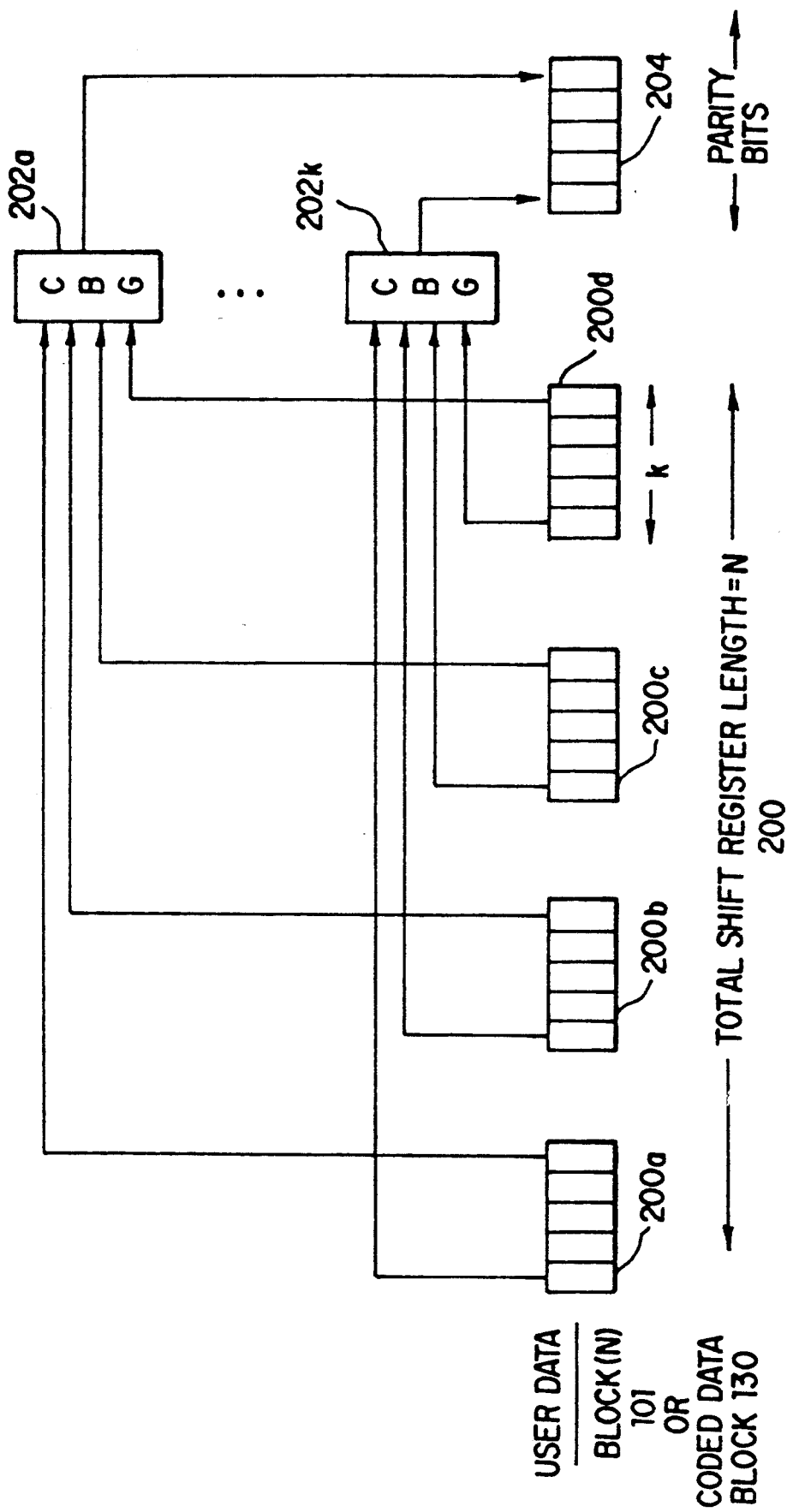
FIG. 2 is a block diagram showing an alternate embodiment of the apparatus of the present invention for implementing and erasure burst correction encoder.

Turning now to FIG. 2, there is shown therein an erasure burst error correction encoder system, which operates independently from the circuitry of FIG. 1. There are at least two ways to recognize that a block is affected by a burst of errors. First, when the read signal corresponding to all or a portion of the block has an unusual waveform, that is, when the waveform has atypical sequences of 0's and 1's. Second, when there is significant and frequent violation of the modulation constraints within the block. These are examples of the so-called erasure channel where, by virtue of the knowledge of the position of error, significant gains in error correction capability of codes may be expected. If one or more blocks within a sector are identified as erroneous, it is possible to restore them with a simple scheme and with a relatively small penalty in overhead. The following is an example with realistic numbers which explains the inventive method of burst-error-correction.

Suppose that the 512 user Bytes that typically comprise a sector on a disk are divided into 64 blocks of 64 bits each. Subsequently, each block is modulated by some appropriate modulation code and, after additional bits for random error correction and synchronization have been added, we may presume that its length, in units of modulation bits, has become L=150. Suppose now that the longest possible burst that can occur within this sector has a length of 1050 (in units of modulation bits), and that the probability of two or more bursts occurring within a given sector is negligible. Therefore, the maximum number of consecutive blocks that can be affected by the burst is eight, which corresponds to 512 successive user bits.

The present burst-error-correction scheme divides the 512 Bytes of user data (prior to modulation) into eight segments of length 512 bits each, and generates a ninth segment of equal length, consisting solely of parity check bits. The n'th parity check bit (1 N 512) is chosen such that the n'th bits from all nine segments satisfy the condition of even (or odd) parity. Thus, by adding 512 simple parity check bits to the original user data, and storing the resulting 72 blocks of modulation code all in one sector, an immunity against single bursts is achieved that can be as long as 9.72% of the total length of the sector.

In FIG. 2, the user data block 101 is moved into a shift register 200 having a length equal to N. The shift register 200 consists of a number of smaller blocks 200a, 200b, 200c and 200d, all having the same length, shown as k in FIG. 2.

After the user data block 101 has been input into the shift register 200, one bit from each block is output into a respective register of one of a respective k plurality check bit generators (CBG) 202a-202k. The output from those check bit generators 202a-202k is k parity bits. Those k parity bits are stored in a shift register 204 of length k.

Figure 4:
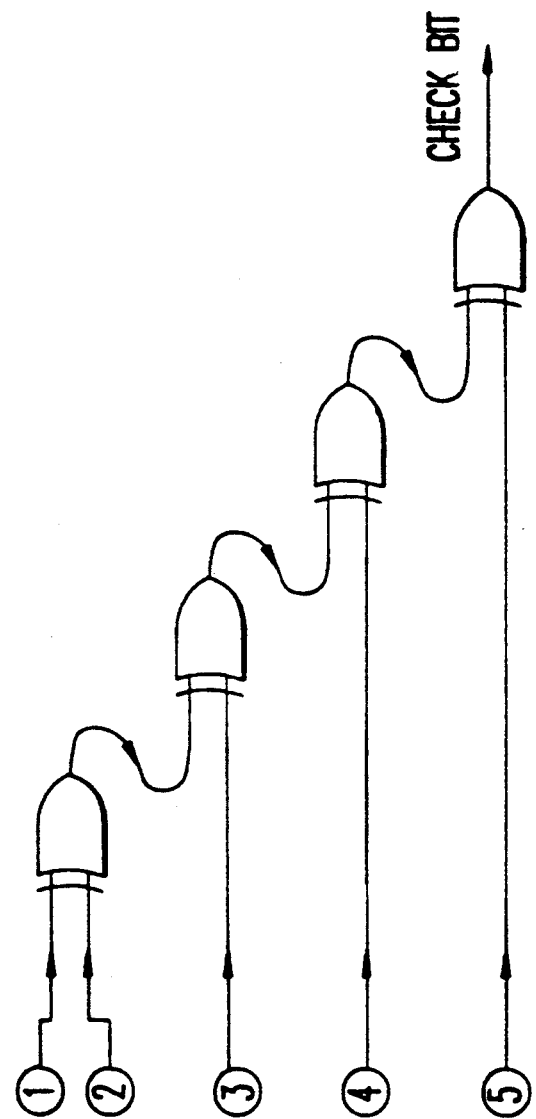
FIG. 4 is a schematic diagram of a check bit generator which may be used with the circuitry of the present invention.

Each CBG receives one bit from each of the blocks in the shift register 200 and produces a single output bit. The total number of input bits is thus equal to N/k. FIG. 4 shows an example of the construction a check bit generator using simple gates, such as exclusive OR (XOR) gates. In the example shown in FIG. 4, 5 input bits are received by the CBG and generate an even-parity check bit at the output of the CBG. That circuit can be expanded by an additional XOR gate for each additional bit to be processed.

After the parity bits have been input to the shift register 204, the user data with burst error correction overhead then fills (N/k)+1 shift registers. Each shift register's contents are then separately modulated and error-correction coded, as described in connection with FIG. 1. Thus, after the raw user data 101 is input to the shift register 200 and the contents of the register 204, which consists of the parity bits generated by the CBG's, then the contents of the shift register 200 plus the contents of the shift register 204 must be modulated and error correction coded. For that purpose, each sub-block 200a, 200b, 200c, 200d and 204 is transmitted separately to the modulator/encoder circuitry of FIG. 1. The resulting coded data 130a produced by the circuitry of FIG. 1 has then been burst error corrected.

The coded data 130a which includes the burst error correction overhead may be decoded and demodulated in the same manner as described in connection with the decoding and demodulation of the coded data 130 of FIG. 1.

If, after decoding and demodulation of the user data with burst error correction coding 130a, one of the blocks of length k is known to be incorrect, then the contents of that block can be ignored and the correct user data values found from the remaining N/k blocks. The correction circuitry is the same as that shown in FIG. 2 with the exception that the blocks of the shift register 200 contain the blocks whose data is known to be correct. The block of the shift register 204 whose contents is produced by the CBG's from correct data, now replaces the only block whose contents are known to be incorrect. The user data is then outputted from the shift registers 200 and 204 for use by the user.

The circuitry shown in FIG. 2 can also be used in an alternative manner. For example, instead of inputting raw user data 101 to the shift register 200, the modulated and properly coded data 130 from output of the circuitry of FIG. 1 may be used as the input to the shift register 200 of FIG. 2. Using that scheme, only the parity bits stored in the shift register 204 need to be modulated when input to the circuitry of FIG. 1.

Thus, using this alternative scheme, the raw user data 101 is first sent to the modulator/random error correction circuitry of FIG. 1. The coded data 130 output from that circuitry is then loaded into the shift register 200 of FIG. 2. At that point, the contents of the shift register 200 are ready for storage on a disk. However, the contents of the shift register 204 are not ready for storage. It will be recalled that the contents of the shift register 204 are generated by the CBG's 202a-202k, from the registers 200a, 200b and 200d. But, before being stored on the disk, the contents of the shift register 204 must be modulated and random error correction coded. That is accomplished by sending the contents of the register 204 to the circuitry of FIG. 1 and generating a block of coded data which corresponds to the contents of the register 204 which is then stored with the contents of the shift register 200. That corresponding coded data block is stored following the original coded data block 130, that is, the contents of the shift register 200, to form the total coded data block 130b.

In order to decode the coded data 130b produced by such alternative usage of the circuitry of FIG. 2, the parity bits must first be demodulated. Then, any burst error in the user data whose location is known (for example, erasure errors) and whose length is less than k (but not necessarily confined to one of the sub-blocks of length k shown in the circuitry of FIG. 2) can be regenerated from the remaining or correct part of the block in the same manner as discussed above in connection with the coded data 130a.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A method of providing burst error correction coding for a block of user data of length N, comprising the steps of:
    inputting said block of user data into a first shift register having a plurality of blocks of length k, said shift register having a total length N;
    generating a k plurality of parity bits using the user data from each of the plurality of blocks of length k;
    separately modulating and error correction coding each one of said plurality of blocks of length k and said k plurality of parity bits; and
    assembling a burst error correction coded block of user data by storing the results from modulation error correction coding said plurality of blocks of length k and said k plurality of parity bits sequentially following each other in a second shift register.

2. The method of claim 1, wherein said step of generating a k plurality of parity bits using said user data from each of said plurality of blocks of length k utilizes one bit from each of said plurality of blocks.

3. A method of providing burst error correction coding for a block of user data of length N, comprising the steps of:
    modulating and error correction coding said block of user data of length N to produce a coded data block;
    inputting said coded data block into a first shift register having a plurality of blocks of length k, said shift register having a length N;
    generating a k plurality of parity bits using the contents from each of the plurality of blocks of length k;
    modulating and error correction coding said k plurality of parity bits; and
    storing said modulated and error correction coded k plurality of bits following said coded data block as contents of a second shift register, thus forming a block of burst error correction coded user data.

4. The method of claim 3, wherein said step of generating a k plurality of parity bits using the contents from each of the plurality of blocks of length k utilizes one bit from each of said plurality of blocks.

* * * * *